(12) United States Patent
Higuchi

(10) Patent No.: US 8,363,128 B2
(45) Date of Patent: Jan. 29, 2013

(54) IMAGE PROCESSING APPARATUS AND IMAGE PROCESSING METHOD

(75) Inventor: Masayu Higuchi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 12/852,867

(22) Filed: Aug. 9, 2010

(65) Prior Publication Data

US 2011/0032412 A1    Feb. 10, 2011

(30) Foreign Application Priority Data

Aug. 10, 2009 (JP) ................................. 2009-185809
Dec. 30, 2009 (KR) ........................ 10-2009-0134912

(51) Int. Cl.
*H04N 5/262*    (2006.01)

(52) U.S. Cl. ............. 348/240.99; 348/231.3; 348/222.1; 348/345

(58) Field of Classification Search .................. None
See application file for complete search history.

(56) References Cited

U.S. PATENT DOCUMENTS

| | | | | |
|---|---|---|---|---|
| 5,065,172 A | * | 11/1991 | Ogawa | 396/82 |
| 2001/0038418 A1 | * | 11/2001 | Suda et al. | 348/347 |
| 2005/0254808 A1 | * | 11/2005 | Okawara | 396/79 |
| 2009/0147022 A1 | * | 6/2009 | Okuda et al. | 345/611 |
| 2010/0231797 A1 | * | 9/2010 | Jiang et al. | 348/607 |

* cited by examiner

*Primary Examiner* — Chieh M Fan
*Assistant Examiner* — Angel L Garces-Rivera
(74) *Attorney, Agent, or Firm* — Drinker Biddle & Reath LLP

(57) ABSTRACT

An image processing apparatus and image processing method generate a motion picture with smooth zooming changes when a user manually operates a zoom lens while the motion picture is being captured. The image capturing apparatus includes a recording unit in which a plurality of images that are captured while a zoom lens, which enlarges or reduces images of an object, is manually operated by a user, and in which focal lengths corresponding to the plurality of images are recorded; a focal length calculating unit that calculates smoothing focal lengths based on the recorded focal lengths for smooth chronological variations of focal lengths; and an image generating unit that generates smoothing images having a viewing angle corresponding to the smoothing focal length based on the smoothing focal length, the recorded focal lengths, and the recorded image data.

18 Claims, 10 Drawing Sheets

IMAGE PROCESSING APPARATUS AND IMAGE PROCESSING METHOD

CROSS-REFERENCE TO RELATED PATENT APPLICATIONS

This application claims the priority benefits of Japanese Patent Application No. 2009-185809, filed on Aug. 10, 2009, in the Japanese Intellectual Property Office, and Korean Patent Application No. 10-2009-0134912, filed on Dec. 30, 2009, in the Korean Intellectual Property Office, the disclosures of which are incorporated herein in their entirety by reference.

BACKGROUND

1. Field of the Invention

Embodiments relate to an image processing apparatus and an image processing method.

2. Description of the Related Art

In a video camera for mainly capturing motion pictures, images are continuously captured during a zooming operation. In other words, images of an object are continuously captured and stored while zooming in on or out from the object. Therefore, it is necessary for a video camera, which is currently recording, to zoom smoothly (little variations in zooming speed), so that a recorded motion picture appears natural to a viewer.

Meanwhile, in a still image camera, such as a digital single-lens reflex (DSLR) camera to which various lenses may be mounted, no image is typically captured during a zooming operation. Although there are exceptions, such as zooming between exposures, a zooming operation is not performed during normal image capturing. Furthermore, to quickly reach to a desired zoom magnification, a zoom lens employs a mechanism for manually rotating a zoom ring.

SUMMARY

Embodiments include an image processing apparatus and image processing method for generating a motion picture with smooth zooming changes when a user manually operates a zoom lens while the motion picture is being captured.

According to an embodiment, an image processing device includes a recording unit in which a plurality of images that are captured while a zoom lens, which enlarges or reduces images of an object, is manually operated by a user, and in which focal lengths corresponding to the plurality of images are recorded; a focal length calculating unit that calculates smoothing focal lengths based on the recorded focal lengths for smooth chronological variations of focal lengths; and an image generating unit that generates smoothing images having a viewing angle corresponding to the smoothing focal length based on the smoothing focal length, the recorded focal lengths, and the recorded image data.

The focal length calculating unit calculates the smoothing focal lengths such that the smoothing images are enlarged with respect to the recorded image data when the image generating unit generates the smoothing images.

The focal length calculating unit may calculate the smoothing focal lengths for smooth chronological variations of the recorded focal lengths during one-way variation, either increasing or decreasing, of the recorded focal lengths.

The focal length calculating unit may calculate the smoothing focal lengths by performing a spline interpolation based on a point selected from the group consisting of a point at which the increasing chronological variations of the recorded focal lengths begin to decrease or the decreasing chronological variations of the recorded focal length begin to increase, a point at which a zooming operation begins, and a point at which the zooming operation ends.

The image generating unit may use the recorded image data as the smoothing images in a case where the chronological variations of the recorded focal lengths are constant or have one-way variation, either increasing or decreasing.

The image generating unit may synthesize the smoothing images and images captured when a zooming operation has stopped.

According to another embodiment, a method of processing images includes recording a plurality of images that are captured while a zoom lens, which enlarges or reduces images of an object, is manually operated by a user, and recording focal lengths corresponding to the plurality of images to a recording unit; calculating smoothing focal lengths based on the recorded focal lengths for smooth chronological variations of focal lengths; and generating smoothing images having a viewing angle corresponding to the smoothing focal lengths based on the smoothing focal lengths, the recorded focal lengths, and the recorded image data.

The smoothing focal lengths may be calculated such that the smoothing images are enlarged with respect to the recorded image data when the smoothing images are generated.

The smoothing focal lengths may be calculated for smooth chronological variations of the recorded focal lengths during one-way variation, either increasing or decreasing, of the recorded focal lengths.

The smoothing focal lengths may be calculated by performing a spline interpolation based on a point selected from the group consisting of a point at which the increasing chronological variations of the recorded focal lengths begin to decrease or the decreasing chronological variations of the recorded focal length begin to increase, a point at which a zooming operation begins, and a point at which the zooming operation ends.

The recorded image data may become the smoothing images in a case where the chronological variations of the recorded focal lengths are constant or have one-way variation, either increasing or decreasing.

The method may further include synthesizing the smoothing images and images captured when a zooming operation has stopped.

According to another embodiment, an image capturing device includes a lens unit including a zoom lens that enlarges or reduces images of an object; an image capturing unit that captures a plurality of images of the object; a recording unit in which a plurality of images that are captured while a zoom lens, which enlarges or reduces images of an object, is manually operated by a user, and in which focal lengths corresponding to the plurality of images are recorded; a focal length calculating unit that calculates smoothing focal lengths based on the recorded focal lengths for smooth chronological variations of focal lengths; and an image generating unit that generates smoothing images having a viewing angle corresponding to the smoothing focal lengths based on the smoothing focal lengths, the recorded focal lengths, and the recorded image data.

After the image capturing operation is completed, the image generating unit may synthesize the smoothing images and images captured when a zooming operation has stopped.

The image generating unit may encode the smoothing images and the images captured when a zooming operation has stopped in parallel.

A flag indicating whether the zoom lens is being manually operated by a user or not may be recorded to the recording unit.

The image capturing unit may include: an imaging device that photoelectrically converts images of the object into electric signals; and an image processing unit that converts the electric signals into displayable image signals.

The lens unit may be a replaceable lens.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
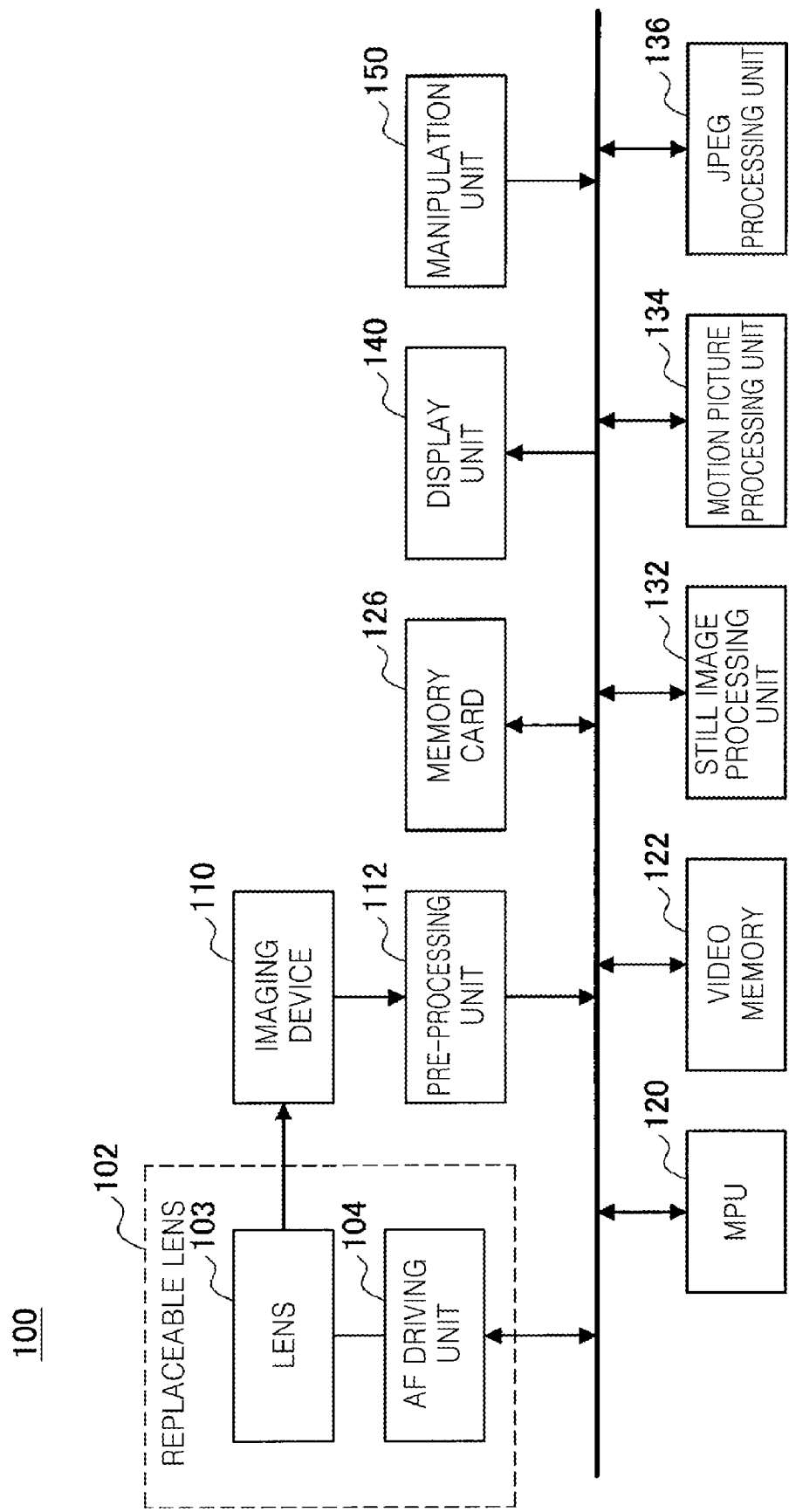
FIG. 1 is a block diagram of an image capturing device, according to an embodiment.

Embodiments will now be described more fully with reference to the accompanying drawings, in which exemplary embodiments are shown. Like reference numerals in the drawings denote like elements, and thus their description will be omitted.

First Embodiment

Configuration of Image Capturing Device

FIG. 1 is a block diagram of an image capturing device 100, according to an embodiment.

First, the configuration of the image capturing device 100 according to an embodiment will be described with reference to FIG. 1.

The image capturing device 100 is a digital single-lens reflex (DSLR) camera, which may capture still images and motion pictures, for example, and allows changing of a lens. For example, the image capturing device 100 includes a replaceable lens 102, an imaging device 110, a pre-processing unit 112, a microprocessor unit (MPU) 120, a video memory 122, a memory card 126, a still image processing unit 132, a motion picture processing unit 134, a JPEG processing unit 136, a display unit 140, and a manipulation unit 150. Furthermore, the image capturing device 100 is not limited to a DSLR camera, and the image capturing device 100 may be a compact type camera to which a replaceable lens may be mounted.

The replaceable lens 102 includes a lens 103 and an AF driving unit 104. Although not shown, the lens 103 may include a zoom lens, an iris, and a focusing lens, for example. Furthermore, a zoom ring, for example, may be arranged on the replaceable lens 102, so that a user may manually change zooming state. An image of an object formed on an imaging surface of the imaging device 110 may be enlarged or reduced by rotating the zoom ring.

The replaceable lens 102 is an optical system for forming an image of external optical information on the imaging device 110 by transmitting light from an object to the imaging device 110. The zoom lens is a lens for changing the viewing angle by changing the focal length. The iris is a unit for controlling the amount of transmitted light. The focusing lens focuses an image of an object on the imaging surface of the imaging device 110 by moving along the optical axis, and is driven by the AF driving unit 104.

The imaging device 110 is a photoelectric converting device, and is formed of a plurality of photoelectric converting elements capable of converting optical information, which is incident to the imaging device 110 after being transmitted through the replaceable lens 102, into electric signals. Each of the plurality of photoelectric converting elements generates electric signals according to the amount of received light. The imaging device 110 may be a charge-coupled device (CCD) sensor or a complementary metal oxide semiconductor (CMOS) sensor.

Furthermore, to control the exposure time of the imaging device 110, a mechanical shutter (not shown) may be used, so that light is incident to the imaging device 110 only when an image is being captured. In some embodiments, an electronic shutter may be used instead of a mechanical shutter. Also, the mechanical shutter or the electronic shutter may be operated by manipulating a shutter button (e.g., the manipulation unit 150).

Furthermore, the imaging device 110 may include a correlated double sampling (CDS)/amplifier (AMP) unit and an analog/digital (ND) converter. The CDS/AMP unit removes reset noise and amplifier (AMP) noise from electric signals output by the imaging device 110 and boosts a level of the electric signals. The A/D converter converts electric signals output by the CDS/AMP unit into digital signals, and outputs the digital signals to the pre-processing unit 112.

The pre-processing unit 112 performs processes to digital signals output by the A/D converter and generates image signals to which image processes may be performed. For example, the pre-processing unit 112 may perform processes such as pixel defect correction, black level correction, and shade correction. The pre-processing unit 112 generates image signals which may be output to the still image processing unit 132, for example. Furthermore, the pre-processing unit 112 controls operations of reading/writing image data with respect to the video memory 122.

The MPU 120 functions as a calculation processing device and a control device under the control of a program, and controls processes performed by each of the components of the image capturing device 100. For example, the MPU 120 outputs a signal to the AF driving unit 104 and drives the focusing lens of the replaceable lens 102. Furthermore, the MPU 120 controls each of the components of the image capturing device 100 based on signals from the manipulation unit 150. Furthermore, in the present embodiment, the image capturing device 100 includes a single MPU 120; however, the image capturing device 100 may include a plurality of MPUs, so that instructions from a signal system and instructions from a control system are processed by separate MPUs.

The video memory 122 may include a synchronous DRAM (SDRAM), for example, and temporarily stores image data of captured images. The video memory 122 has a capacity sufficient for storing image data of a plurality of images. The operations for reading/writing images with respect to the video memory 122 are controlled by the pre-processing unit 112. In the present embodiment, the video memory 122 is an example of a storage unit to which a plurality of images captured by manually operating the zoom lens and focal lengths at the time of capturing each of the plurality of images may be recorded.

Image data is written to the memory card 126, or written image data or setup information are read out from the memory card 126. The memory card 126 is a recording medium, such as a magnetic disk or a semiconductor memory device, for example, and captured image data is recorded thereto. However, the memory card 126 is not limited to being the recording medium, and any of various recording media, such as an optical disc (a CD, a DVD, and a Blu-ray disc) and an opto-magnetic disc, may be used. The memory card 126 may be detachably attached to the image capturing device 100.

The still image processing unit 132 receives image signals from the pre-processing unit 112 and converts the image signals into brightness signals and hue signals. The still image processing unit 132 generates image signals that are image-processed based on WB control values, γ values, and edge embossment control values. The still image processing unit 132 transmits generated image signals to the motion picture processing unit 134 or the JPEG processing unit 136.

The motion picture processing unit 134 receives image data of still images from the still image processing unit 132 and generates motion picture data by performing a coding operation. The motion picture processing unit 134 performs a coding operation in compliance with the MPEG format, for example, and generates stream data, which is generated by grouping a plurality of image frames into a single file. The generated motion picture data is recorded to the memory card 126, for example.

The motion picture processing unit 134 further includes a focal length calculating unit, and calculates a smoothing focal length for smoothing chronological focal length changes based on focal lengths recorded in the video memory 120. Furthermore, the motion picture processing unit 134 is an example of an image generating unit that generates smoothing images having a viewing angle corresponding to the smoothing focal length, based on the smoothing focal length, the focal length recorded in the video memory 122, and image data recorded in the video memory 122.

When a smoothing image is generated, the focal length calculating unit calculates a smoothing focal length, so that the smoothing image is enlarged with respect to recorded image. Furthermore, the focal length calculating unit calculates the smoothing focal length, such that chronological focal length changes are smoothed during one-way variation (increasing or decreasing) of a recorded focal length.

The JPEG processing unit 136 performs compression-encoding with respect to image data from the still image processing unit 132 in compliance with a method of coding still images, e.g. a JPEG format. Compression-encoded data generated by the JPEG processing unit 136 is recorded to the memory card 126. Furthermore, the JPG processing unit 136 performs decompression-decoding with respect to encoded data of still images provided by the memory card 126.

The display unit 140 may receive image data from a video RAM (VRAM), for example, and displays images on a screen. The display unit 140 is installed on the body of the image capturing device 100. Examples of images displayed by the display unit 140 include images prior to capturing an image, the images read out from a VRAM (live view display), various setup screens of the image capturing device 100, and images that are captured and stored. The display unit 140 may be a liquid crystal display (LCD) or an organic electroluminescent (EL) display, for example.

Furthermore, the VRAM is a memory for displaying images, and includes a plurality of channels. The VRAM may receive image data for displaying images from the video memory 122 and output image data with respect to the display unit 140 simultaneously. The resolution or the maximum number of colors of the display unit 140 depends on the capacity of the VRAM.

The manipulation unit 150 may include directional keys, a power switch, a mode dial, and a shutter button that are installed on the image capturing device 100, for example. The manipulation unit 150 transmits control signals to components, such as the MPU 120, based on inputs of a user. For example, a shutter button may be half-pressed (operation S1), fully-pressed (operation S2), and released by a user. The shutter button outputs a control signal for initiating focus control when the shutter button is half-pressed, and the focus control is terminated when the half-pressed shutter is released. Furthermore, the shutter button outputs a control signal for initiating image capture when the shutter button is fully pressed.

Furthermore, the above-stated processes in the image capturing device 100 may be embodied as hardware processes or software processes by a computer program.

Operations of Image Capturing Device

Figure 2A:
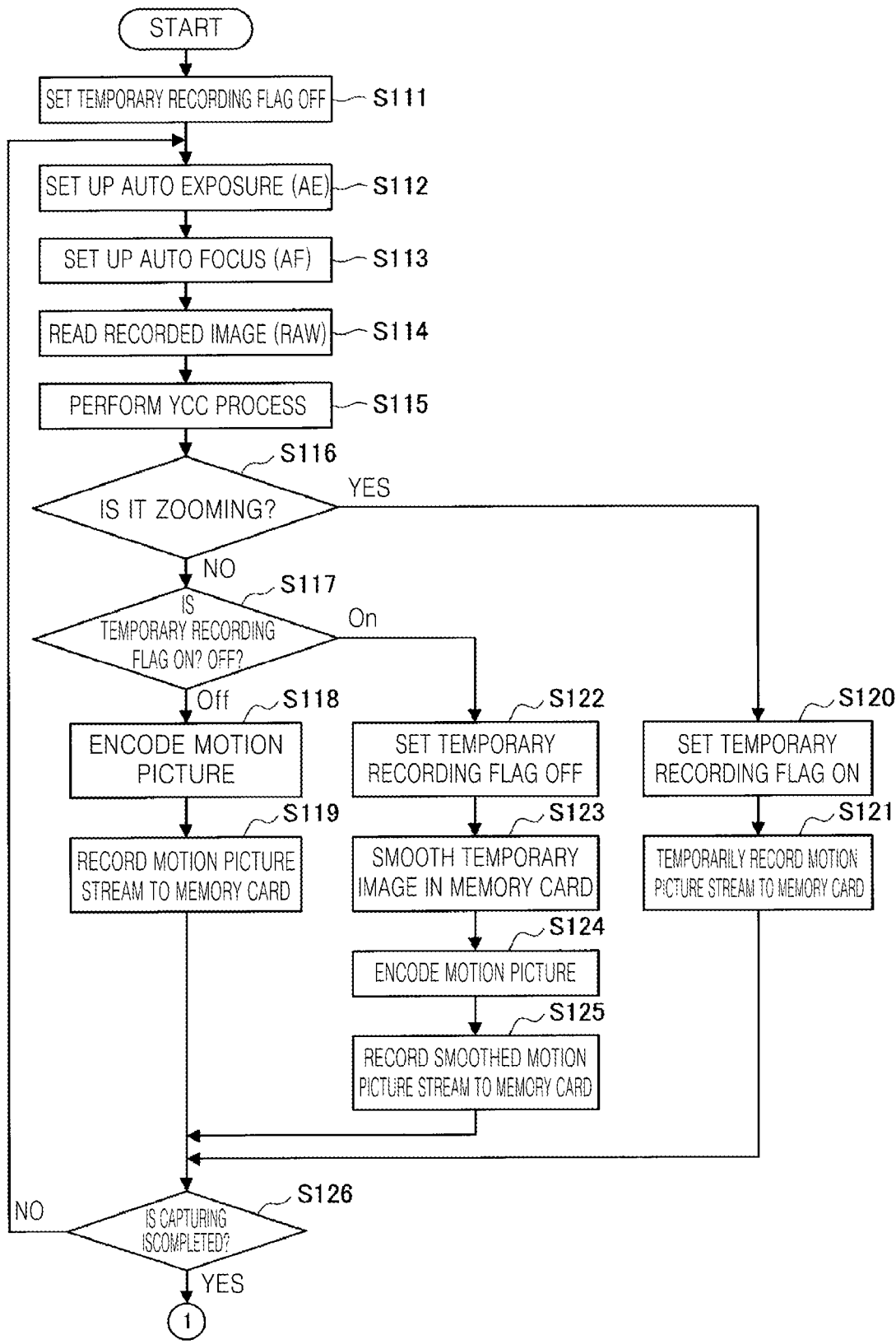
FIGS. 2A and 2B are flowcharts showing motion picture capturing operations of the image capturing device of FIG. 1, according to an embodiment.
Figure 2B:
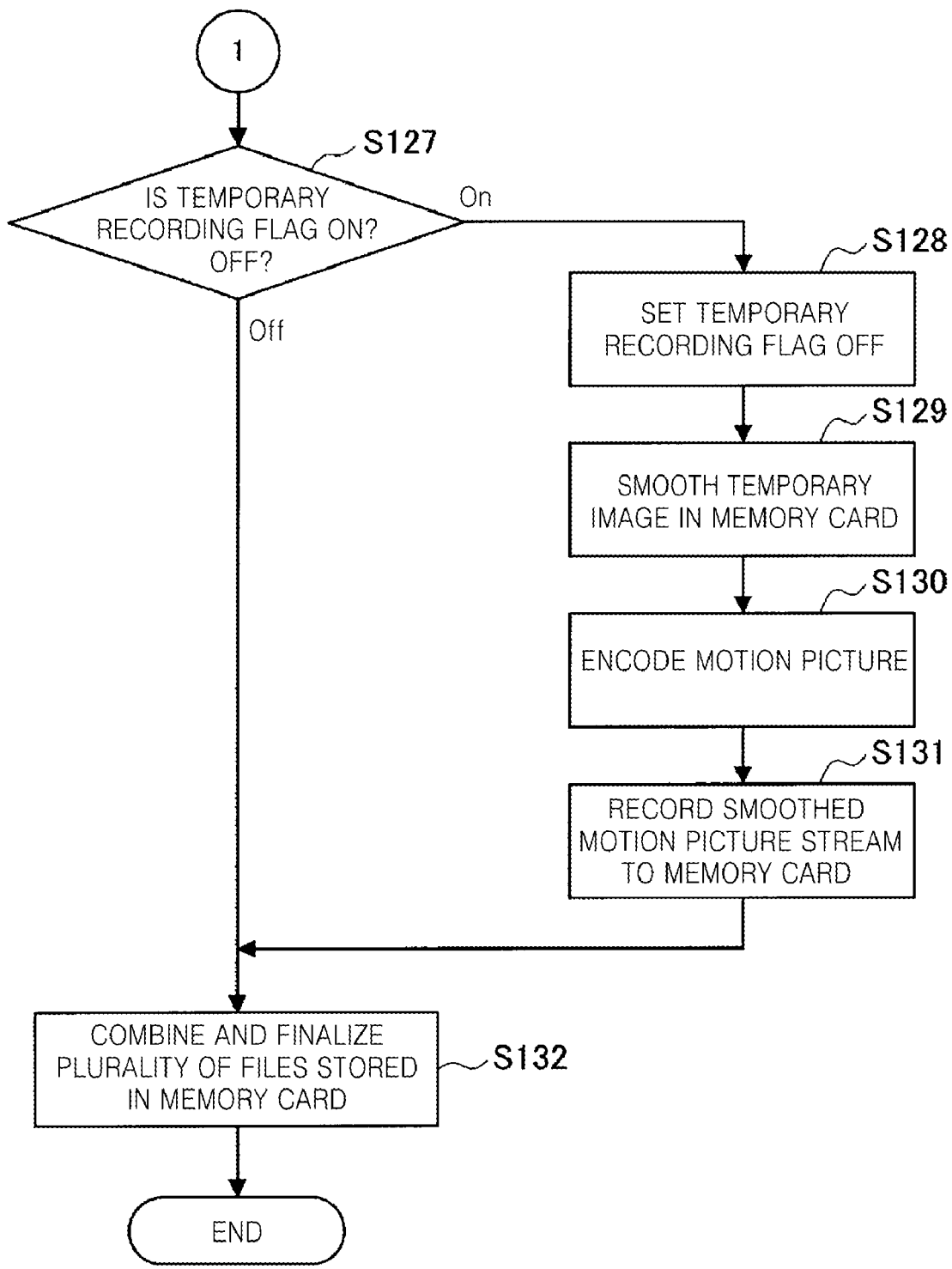

FIGS. 2A and 2B are flowcharts showing motion picture capturing operations of the image capturing device 100, according to an embodiment. Hereinafter, motion picture capturing operations of the image capturing device 100 according to the present embodiment will be described.

When the image capturing device 100 begins to capture a motion picture, a temporary recording flag, which indicates whether image data captured during a zooming operation is recorded in the video memory 122 or not, is set to OFF (operation S111). Then, an auto-exposure (AE) and/or an auto-focus (AF) are/is set (operation S112 and operation S113).

Captured data are read out from the imaging device 110 as RAW image data (operation S114), and a YCC process is performed with respect to the image data in the still image processing unit 132 (operation S115).

Furthermore, it is determined whether a zooming operation is performed or not during the performing of the image capturing operation by the image capturing device 100 (operation S116). It is determined whether a zooming operation is performed or not based on whether the focal length during the image capturing operations varies in one-direction of increasing or decreasing. When a direction in which the focal length varies is reversed or the focal length is constant, it is determined that a zooming operation has stopped.

The determination of the continuation of the zooming operation may be performed at every frame or after every predetermined interval (e.g., every second). However, in cases where the determination of the continuation of the zooming operation is performed after a short period of time (e.g. every frame), a time period, with which it is determined that a zooming operation is being continued, may be shortened, depending on a method of operating the zoom lens. As a result, a number of files with short playback times are generated. Therefore, the determination of the continuation of the zooming operation may be performed after every second.

If it is determined that a zooming operation is not being performed during the image capturing operation, it is then determined whether the temporary recording flag is set to ON or OFF (operation S117). If a zoom operation has not been performed before, the temporary recording flag is set to OFF. Furthermore, if it is determined that the temporary recording flag is set to OFF, motion picture encoding is performed with respect to image data currently being captured (operation 118). For example, the image data may be encoded in MPEG formats. Then, the encoded image data (motion picture stream) is recorded to a recording medium, such as the memory card 126 (operation S119).

In other words, when a zooming operation has not been performed previously and a zooming operation is not being performed, data being captured is recorded to a recording medium as-is.

When it is determined that a zooming operation is not being performed and a motion picture stream is completely recorded to a memory card (operation S119), it is determined whether an image capturing operation is completed or not (operation S126). In case where the image capturing operation is not completed, the process returns to operation S112. Otherwise, the process proceeds to operation S127.

Meanwhile, if it is determined that a zooming operation is being performed during the image capturing in the image capturing device 110, the temporary recording flag, which indicates whether an image is temporarily recorded or not, is set to ON at first (operation S120). Then, image data captured during the zooming operation (motion picture stream), on which the YCC process is performed in operation S115, are sequentially recorded to the video memory (operation S121). Furthermore, the focal lengths corresponding to the captured image data are simultaneously recorded to the video memory 122.

Image data is recorded by frames. However, the determination of the continuation of the zooming operation in operation S116 may be performed after every second as described above, for example. In this case, a previous state of the result of the determination persists in frames with respect to which the determination of the continuation of the zooming operation is not performed. For example, if the previous state refers that a zooming operation is being performed, even frames on which the determination of the continuation of the zooming operation are not performed are considered as frames on which the zooming operation is being performed, and the process proceeds to operations S120 and S121, and thus image data captured with the zooming operation is recorded.

When the temporary recording of a motion picture stream (operation S121) is completed, it is determined whether an image capturing operation is completed or not (operation S126). If it is determined that the image capturing operation is not completed, the process returns to operation S112. Otherwise, if it is determined that the image capturing operation is completed, the process proceeds to operation S127.

In cases where the image capturing operation is not completed, when a zooming operation has stopped, it is determined that the zooming operation has stopped in operation S116, and it is determined that the temporary recording flag is set to ON in operation S117. Then, if it is determined that the temporary recording flag is set to ON in operation S117, the process proceeds to operation S122 and the temporary recording flag is set to OFF. Then, a smoothing process is performed (operation S123) with respect to image data captured during the zooming operation, which are temporarily recorded to the video memory 122 in operation S121. The smoothing process is performed with respect to the image data in which the recorded focal length varies one-way (increasing or decreasing). Accordingly, an image captured with a manual zooming operation of a user is converted into a smooth image.

Then, the smoothed image data is encoded into a motion picture (operation S124). For example, image data may be encoded in an MPEG format. Then, encoded data that is sequentially output (motion picture stream) is recorded in a recording medium, such as the memory card 126 (operation S125). Operations S122 and S123 are performed in parallel to the motion picture encoding operation (operation S118) and the operation of recording motion picture stream to a memory card (operation S119) with respect to an image capturing operation without a zooming operation being performed.

When it is determined that a zooming operation is not being performed and a smoothed motion picture stream is completely recorded to a memory card (operation S125), it is determined whether an image capturing operation is completed or not (operation S126). In case where the image capturing operation is not completed, the process returns to operation S112. Otherwise, in case where the image capturing operation is completed, the process proceeds to operation S127.

In operation S127, it is determined whether the temporary recording flag is set to ON or OFF. When an image capturing operation is completed during a zooming operation, the temporary recording flag is set to ON, and thus the process proceeds to operation S128. Otherwise, the temporary recording flag is set to OFF, and thus the process proceeds to operation S132.

In case where an image capturing operation is completed during a zooming operation, a smoothing process with respect to a temporarily recorded image data captured during the zooming operation is not yet performed. Therefore, the temporary recording flag is set to OFF first (operation S128). Then, image data captured during the zooming operation which is temporarily recorded to the video memory 122 is smoothed (operation S129). Accordingly, an image captured with a manual zooming operation of a user is converted into a smooth image.

Then, the smoothed image data is encoded into a motion picture (operation S130). Then, the encoded data that is sequentially output (motion picture stream) is recorded in a recording medium, such as the memory card 126 (operation 131). Operations S128 through S131 are performed after an image capturing operation is completed.

Then, since image data that is smoothed throughout an image capturing operation and image data that is not required to be smoothed are separately recorded to the memory card 126, a finalize process is performed by synthesizing both of the image data into one motion picture file (operation S132). Therefore, even in cases where a user performs a manual zooming operation during an image capturing operation, smoothed image data may be recorded instead of image data containing images captured by manually zooming as-is.

Figure 11:
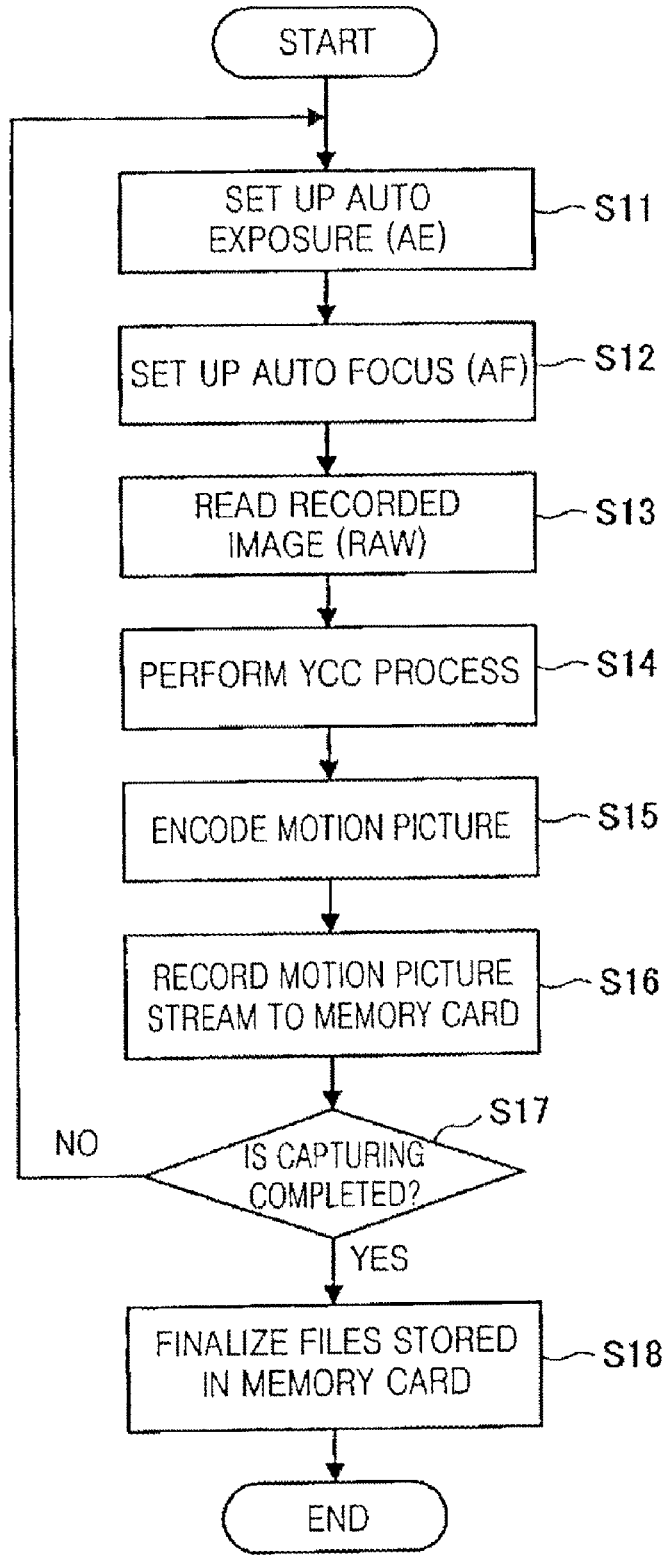
FIG. 11 is a flowchart showing motion picture capturing operations of a conventional image capturing device.

FIG. 11 is a flowchart showing motion picture capturing operations of a conventional image capturing device. Operations S11, S12, S13, S14, S15, S16, and S17 of FIG. 11 correspond to operations S112, S113, S114, S115, S118, S119, and S126 of FIG. 2A, respectively. In the image capturing device 100 according to the present embodiment, performing an operation S111 first, and performing various processes based on whether a zooming operation is being performed or not after the YCC process in operation S115 is different compared to the conventional image capturing device as illustrated in FIG. 11. In the conventional image capturing device, coding of a motion picture in operation S15 and recording of motion picture stream to the memory card 126 in operation S16 is performed, and capturing of an image is completed after a YCC process in operation S14 is performed, regardless of whether a zooming operation is being performed or not. In the conventional image capturing device, after capturing of the image is completed, files stored in the memory card regardless of whether a zooming operation was performed or not are finalized (operation S18).

Figure 6:
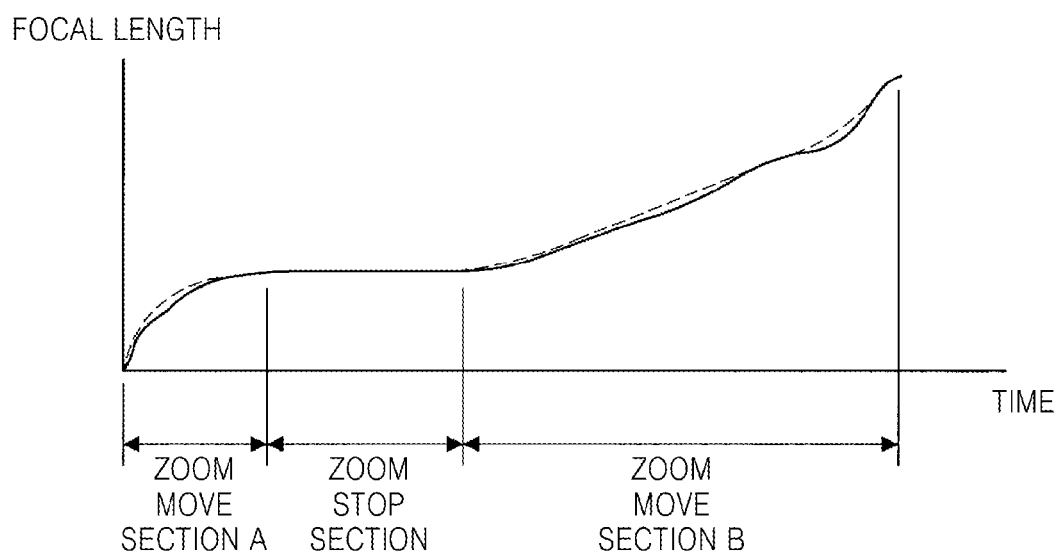
FIG. 6 is a graph showing characteristics of focal length variations during an exemplary image capturing operation.

FIG. 6 is a graph showing characteristics of focal length variations during an exemplary image capturing operation. As shown in FIG. 6, a number of times in which an image is captured during a zooming operation being manually performed by a user is two, in a zoom move section A and a zoom move section B. A zoom stop section between the zoom move section A and the zoom move section B is the section during which images are captured without a zooming operation. In this case, three files containing smoothed image data and image data not smoothed are generated by an embodiment, and thus the finalization is performed by synthesizing the three files (operation S132).

Smoothing Process

Figure 3:
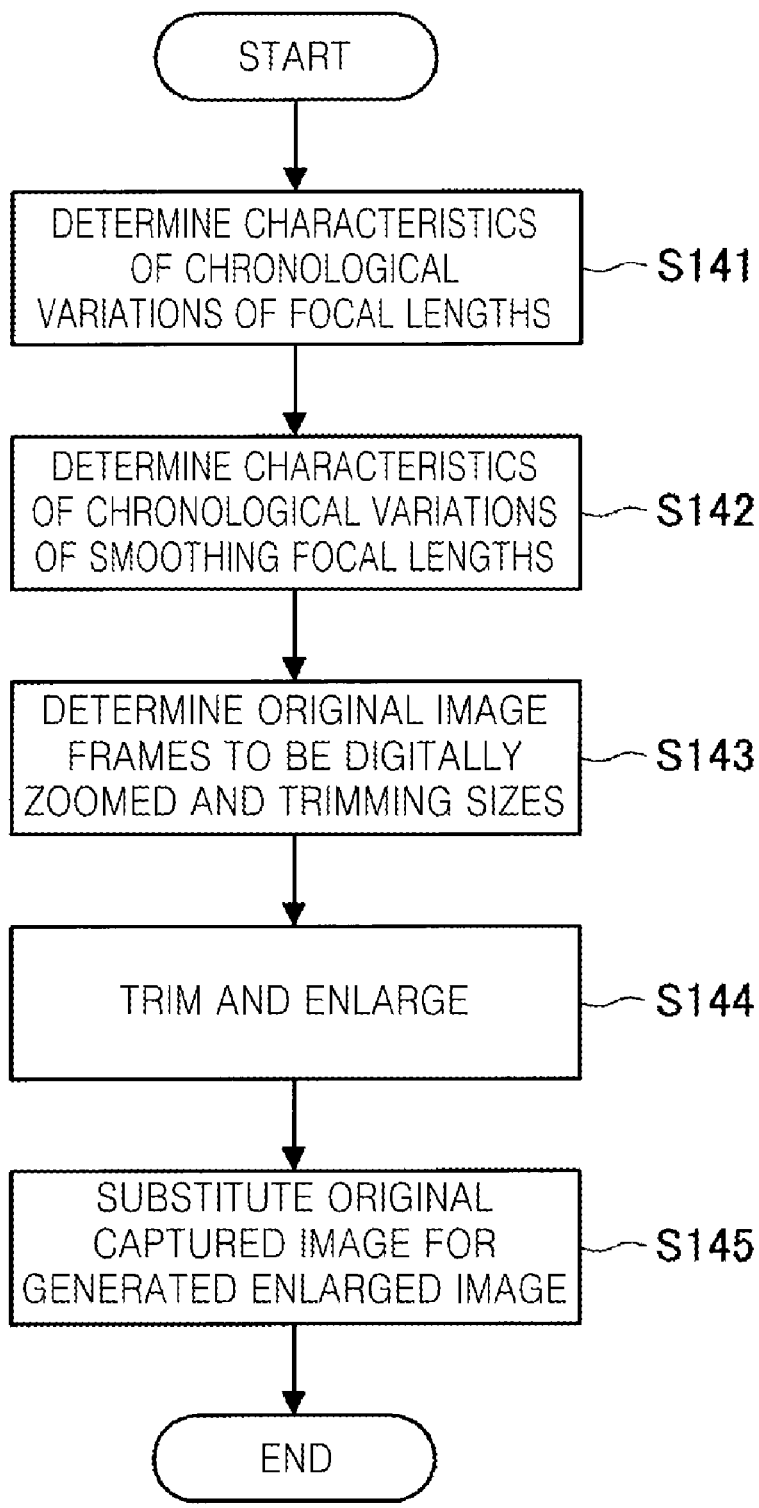
FIG. 3 is a flowchart showing operations for smoothing images recorded in a memory of the image capturing device of FIG. 1, according to the present embodiment.
Figure 4:
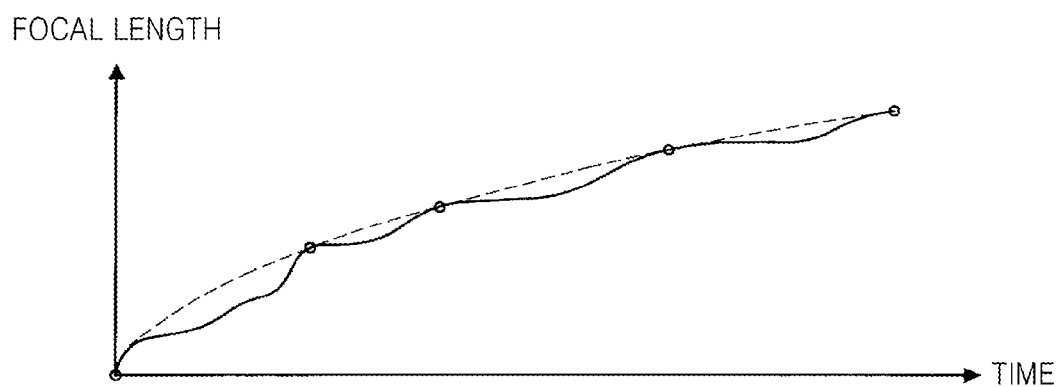
FIG. 4 is a graph showing characteristics of focal length variations during an exemplary zooming-in operation.
Figure 5:
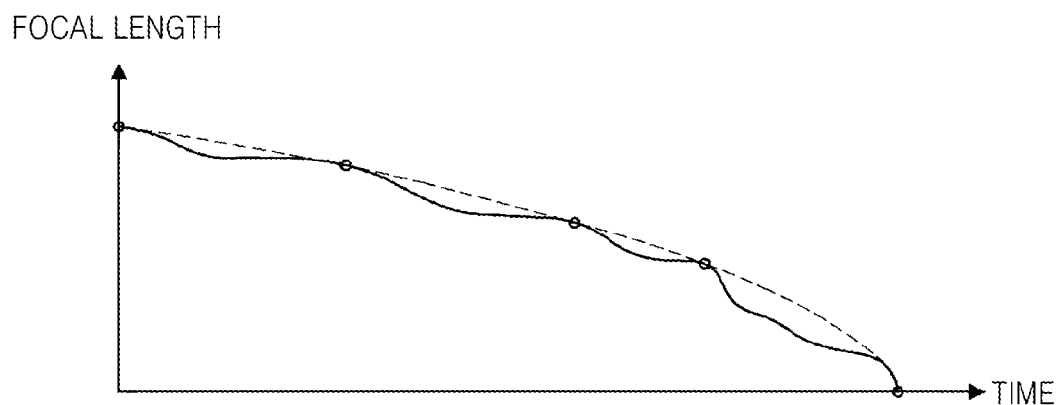
FIG. 5 is a graph showing characteristics of focal length variations during an exemplary zooming-out operation.
Figure 10:
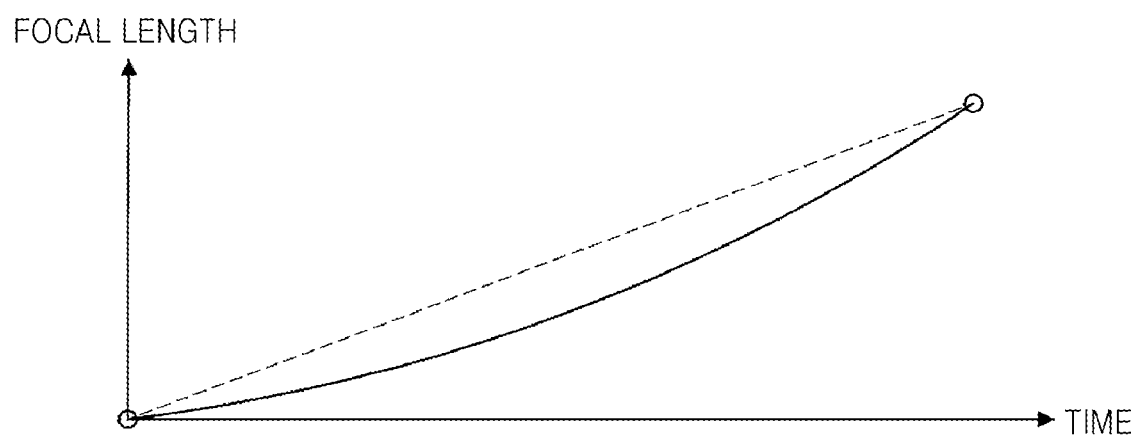
FIG. 10 is a graph showing characteristics of focal length variations.

Next, operations for smoothing images, which are temporarily recorded in the video memory 122, captured during a zooming operation will be described below. FIG. 3 is a flowchart showing operations for smoothing images recorded in a memory of the image capturing device 100, according to the present embodiment. FIGS. 4 and 5 are graphs showing characteristics of focal length variations, where FIG. 4 shows characteristics of focal length variations during an exemplary zooming-in operation, and FIG. 5 shows characteristics of focal length variations during an exemplary zooming-out operation. FIG. 10 is a graph showing characteristics of focal length variations.

Image data that is captured during a zooming operation manually performed by a user manually operating a zoom lens is recorded as a plurality of frames in the video memory 122. Furthermore, focal lengths $f_0$, which are focal lengths corresponding to the captured image data, are simultaneously recorded in the video memory 122. Therefore, image data of each of the frames and corresponding focal lengths $f_0$ during a zooming operation are obtained, and characteristics of chronological variations of the focal lengths $f_0$ during an image capturing operation as indicated with solid lines in FIGS. 4 and 5 are determined, for example (operation S141).

Next, characteristics of chronological variations of smoothing focal lengths fs during an image capturing operation are made (operation S142). In operation S142, chronological variations of $\Delta f_0/\Delta t$ are calculated by calculating $\Delta f_0/\Delta t$ according to characteristics of chronological variations of $f_0$. Then, a point at which $\Delta f_0/\Delta t$ begins to decrease is determined, as indicated by white dots in FIGS. 4 and 5. Then, based on the determined point, a point at which a zooming operation begins, and a point at which the zooming operation ends, a secondary spline interpolation is performed, for example, and smoothing focal lengths fs of each of the time points, as indicated with dashed lines in FIGS. 4 and 5, are calculated.

Alternatively, the smoothing focal lengths fs may be calculated using a method other than the interpolation stated above. The smoothing focal lengths fs may be calculated, such that image data corresponding to the smoothing focal lengths fs becomes larger than original captured image data. In other words, the smoothing focal lengths fs may lean further to the telescopic end as compared to the focal lengths $f_0$ at the time of performing the image capturing operation, such that the dashed lines are located above the solid lines in FIGS. 4 and 5.

Then, to generate smoothing image data from captured image data, original image frames to be digitally zoomed and trimming sizes are determined (operation S143). Original image frames to be digitally zoomed are determined by extracting frames, of which the focal lengths $f_0$ at the time of an image capturing operation and the smoothing focal lengths fs are different, such that the solid line and dashed line are not overlapped in FIGS. 4 and 5. Trimming sizes are determined by calculating enlargement ratios with respect to original image frames based on the focal lengths $f_0$ at the time of an image capturing operation and the smoothing focal lengths fs.

Furthermore, when the smoothing focal lengths fs are calculated, the focal lengths $f_0$ at the time of an image capturing operation may become greater than the calculated smoothing focal length fs, depending on interpolation methods or characteristics of focal length variations. At this point, if enlargement ratio with respect to original image frames is calculated based on the focal lengths $f_0$ at the time of an image capturing operation and the smoothing focal lengths fs, the size of the smoothing image frames are reduced as compared to the original image frames. In this case, the smoothing image frames cannot be trimmed, and thus the original image frames are used as smoothing image frames. Furthermore, in case where images are being captured to a size slightly larger than the size of the original image frame on the imaging surface of the imaging device 110, the smoothing image frames may be reduced with respect to the original image frame by using the portions outside the original image frames.

Next, smoothing image frames are generated by performing trimming and enlargement by using the calculated enlargement ratio and the captured image frames (operation S144). Then, the original captured image frames are substituted for the generated smoothing image frames (operation S145). Accordingly, image data, which is temporarily recorded in the video memory 122, captured during a zooming operation is smoothed.

The smoothing process is performed after a series of image capturing operations are completed or after a zooming operation manually performed by a user is completed.

Furthermore, as shown in FIG. 10, in a case where the focal lengths $f_0$ at the time of performing the image capturing operation vary smoothly and there is no point at which $\Delta f_0/\Delta t$ begins to decrease, when interpolation is performed based on a point at which a zooming operation begins and a point at which the zooming operation ends, a dashed line may be obtained. However, since it is zoomed smoothly by a manual operation, and, when a smoothing process is performed, the resolution of images is changed due to trimming and enlargement, the original image data is used without performing a smoothing process. In other words, when a number of points at which $\Delta f_0/\Delta t$ begins to decrease is counted and the counted number is zero, operations S143 through S145 are omitted, and thus the smoothing process is omitted.

Another Embodiment

Next, an image processing device 200 according to another embodiment will be described.

In the previous embodiment (image processing device 100), images captured during a zooming operation are not encoded in real-time and are temporarily recorded and the images are smoothed after a zooming operation. In the present embodiment (image processing device 200), images are not smoothed during an image capturing operation. Rather, the images are smoothed by using a data processing device (image processing device), such as a personal computer, based on original image data and focal lengths at the time of performing the image capturing operation after the images are captured.

Figure 7:
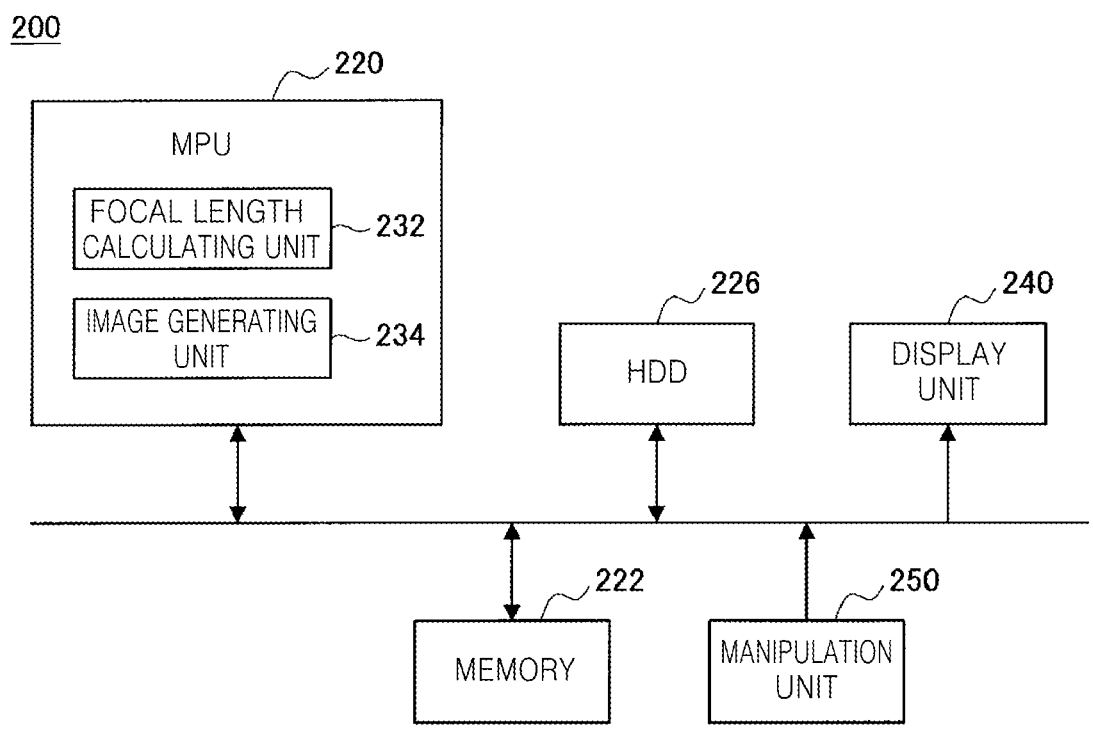
FIG. 7 is a block diagram of an image processing device according to another embodiment.

FIG. 7 is a block diagram of the image processing device 200 according to the present embodiment. The image processing device 200 includes a MPU 220, a memory 222, a hard disk drive (HDD) 226, a display unit 240, and a manipulation unit 250. The MPU 220 includes a focal length calculating unit 232 and an image generating unit 234.

The MPU 220 functions as a calculation processing device and a control device under the control of a program, and controls processes performed by each of the components of the image capturing device 200. Programs executed by the MPU 220 are recorded in the memory 222. The HDD 226 is an example of a recording medium and a control device thereof. For example, images captured by an image capturing device are stored in the HDD 226, and, during a smoothing process, recorded images are read out therefrom. Furthermore, smoothed images generated in the present embodiment are newly recorded thereto. The recording medium is not limited to the HDD, and any of various recording media, such as an optical disc, may be used.

The display unit 240 may be a LCD or an organic EL display, for example, and displays images on a screen. The manipulation unit 250 may include a keyboard or a mouse, for example, and transmits control signals input by a user to the MPU 220. Furthermore, the HDD 226, the display unit 240, and the manipulation unit 250 may be either integrated with the image processing device 200 or detachably installed on the image processing device 200.

The focal length calculating unit 232 calculates smoothing focal lengths based on the recorded focal lengths for smooth chronological variations of focal lengths. The image generating unit 234 generates smoothing images having a viewing angle corresponding to the smoothing focal lengths based on the smoothing focal lengths, the recorded focal lengths, and image data read out from the HDD 226. Furthermore, the MPU 220 decodes image data and encodes smoothed image data into a motion picture. Furthermore, the MPU 220 substitutes original images for smoothed images and merges the smoothed images and images that are not smoothed.

Figure 8:
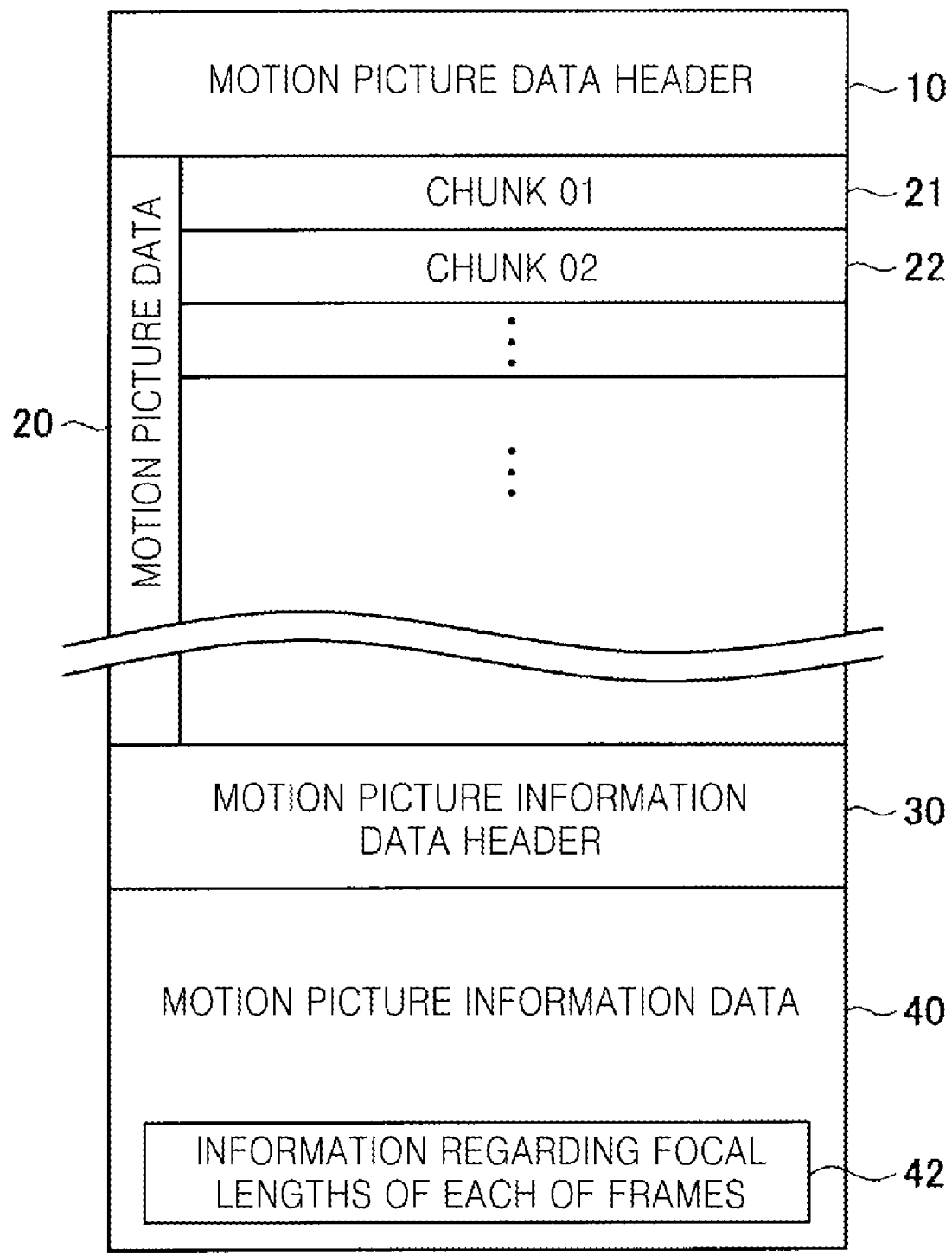
FIG. 8 is a descriptive diagram showing the data structure of a motion picture file that may be used in the image processing device of FIG. 7, according to an embodiment.

In the present embodiment, focal lengths related to each of the captured frames are recorded first. An image capturing device records motion picture data and focal length information in a motion picture format as shown in FIG. 8, for example. FIG. 8 is a descriptive diagram showing the data structure of a motion picture file that may be used in the image processing device 200, according to an embodiment.

The motion picture file includes a motion picture data header 10, motion picture data 20, a motion picture information data header 30, and motion picture information data 40.

The motion picture data header 10 includes identification information of the motion picture data 20 and the total size of the motion picture data 20. The motion picture data 20 is identified based on the identification information of the motion picture data 20.

The motion picture data 20 is divided into a plurality of blocks, e.g., chunk01 21, chunk02 22, and so on. In the present embodiment, one chunk is formed of a group of frame data for a one second period of time.

The motion picture information data header 30 includes the horizontal/vertical pixel sizes, the frame rate, and the type of format of a corresponding motion picture, and also includes numbers of frames of each of the chunks and address information for accessing to the motion picture data 20.

Information 42 regarding focal lengths of each of the frames is recorded to the motion picture information data 40.

Next, a zoom-smoothing process performed by the image processing device 200 will be described below.

Figure 9:
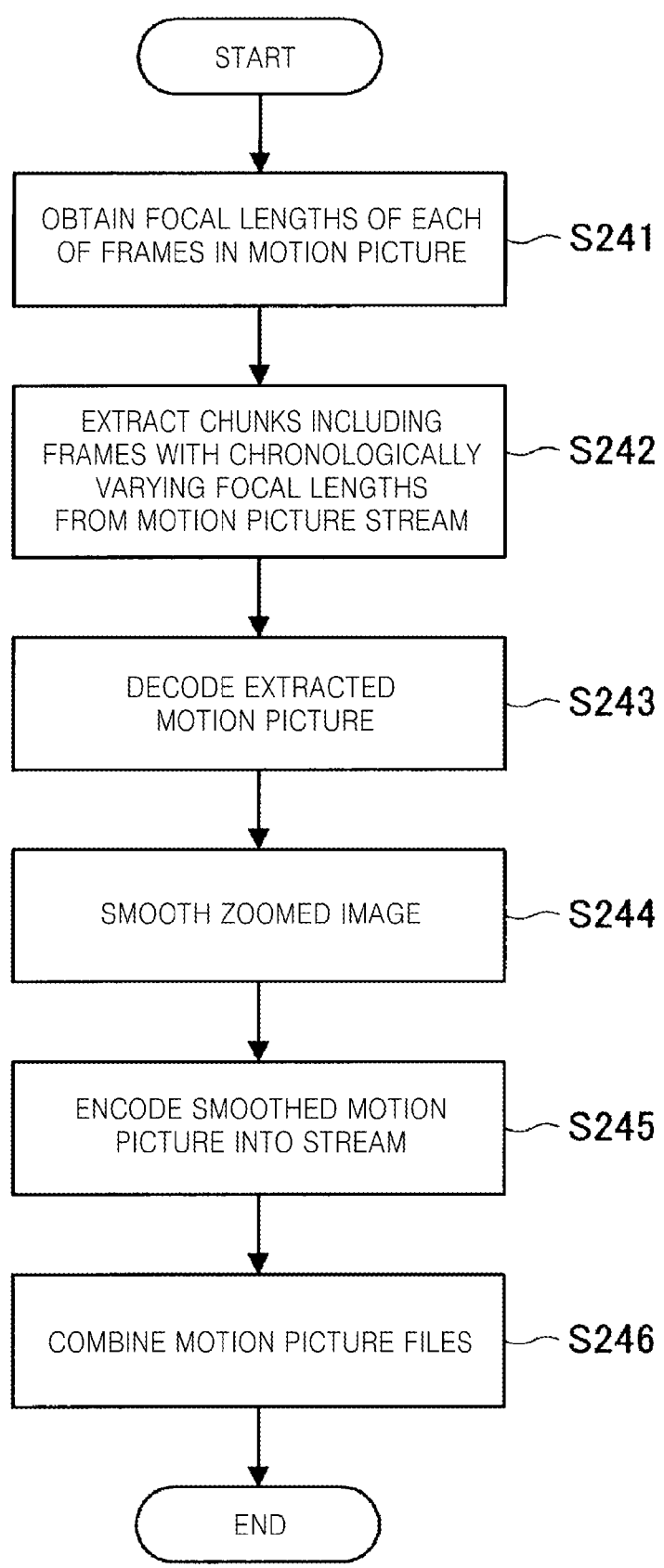
FIG. 9 is a flowchart showing a zoom-smoothing process performed by the image processing device of FIG. 7, according to an embodiment.

FIG. 9 is a flowchart showing a zoom-smoothing process performed by the image processing device 200, according to an embodiment.

First, information 42 regarding focal lengths of each of the frames is obtained from the motion picture information data 40 (operation S241). Then, frames captured with a zoom operation, that is, frames with chronologically varying focal lengths, are searched for based on the obtained information 42 regarding focal lengths of each of the frames, and a chunk including the searched frames is specified. Then, the specific chunk is extracted (operation S242).

Next, the extracted chunk (a motion picture stream formed of a plurality of frames) is decoded (operation S243). Then, image data captured during a zooming operation is smoothed (operation S244). The smoothing process performed here is identical to the smoothing process in the previous embodiment described above. Thus, images captured during a manual zooming operation are converted into smooth images through the smoothing process.

Then, the smoothed image data is encoded into a motion picture in the unit of chunks. For example, image data may be encoded in the MPEG format. Then, encoded data that is sequentially output (a motion picture stream) is recorded in a recording medium, such as the HDD 226 (operation S245).

Then, chunks of the original motion picture file, where the chunks are prior to the smoothing process, are substituted for chunks on which the smoothing process is performed, and the chunks on which the smoothing process is performed are merged into the original motion picture file (operation S246). Here, in the motion picture file, the motion picture data header 10 and the motion picture information data header 30 are re-written to correspond to the new chunks. Thus, in a single image capturing operation, even if a manual zooming operation is performed by a user during the image capturing operation, data containing images captured during the zooming operation may be converted into a smoothed image.

As described above, according to various embodiments, image frames are trimmed based on image frames captured during a zooming operation, focal lengths corresponding to the image frames, and smoothing focal lengths, so that a motion picture is smoothly zoomed. Here, the smoothing focal lengths may lean further to the telescopic end as compared to the focal lengths at the time of performing an image capturing operation.

As a result, zooming speed may be prevented from being irregular when a motion picture is captured by using an image capturing device having a manual zoom, e.g. a DSLR. Furthermore, a motion picture with smooth zoom variations may be generated without using a replaceable lens with a motor-driven zoom.

The device described herein may comprise a processor, a memory for storing program data executable by the processor, a permanent storage such as a disk drive, a communications port for handling communications with external devices, and user interface devices, etc. Any processes may be implemented as software modules or algorithms, and may be stored as program instructions or computer readable codes executable on the processor on a non-transitory computer-readable storage media such as read-only memory (ROM), random-access memory (RAM), CD-ROMs, magnetic tapes, floppy disks, and optical data storage devices. The computer readable storage medium can also be distributed over network coupled computer systems so that the computer readable code is stored and executed in a distributed fashion. This computer readable code can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. An image processing device comprising:
    a recording unit in which a plurality of images that are captured while a zoom lens, which enlarges or reduces images of an object, is manually operated by a user, and in which focal lengths corresponding to the plurality of images are recorded;
    a focal length calculating unit that calculates smoothing focal lengths based on the recorded focal lengths for smooth chronological variations of focal lengths; and
    an image generating unit that generates smoothing images having a viewing angle corresponding to the smoothing focal length based on the smoothing focal length, the recorded focal lengths, and the recorded image data.

2. The image processing device of claim 1, wherein the focal length calculating unit calculates the smoothing focal lengths such that the smoothing images are enlarged with respect to the recorded image data when the image generating unit generates the smoothing images.

3. The image processing device of claim 1, wherein the focal length calculating unit calculates the smoothing focal lengths for smooth chronological variations of the recorded focal lengths during one-way variation, either increasing or decreasing, of the recorded focal lengths.

4. The image processing device of claim 1, wherein the focal length calculating unit calculates the smoothing focal lengths by performing a spline interpolation based on a point selected from the group consisting of a point at which the increasing chronological variations of the recorded focal lengths begin to decrease or the decreasing chronological variations of the recorded focal lengths begin to increase, a point at which a zooming operation begins, and a point at which the zooming operation ends.

5. The image processing device of claim 1, wherein the image generating unit uses the recorded image data as the smoothing images in a case where the chronological variations of the recorded focal lengths are constant or have one-way variation, either increasing or decreasing.

6. The image processing device of claim 1, wherein the image generating unit synthesizes the smoothing images and images captured when a zooming operation has stopped.

7. A method of processing images, the method comprising:
    recording a plurality of images that are captured while a zoom lens, which enlarges or reduces images of an object, is manually operated by a user, and recording focal lengths corresponding to the plurality of images to a recording unit;
    calculating smoothing focal lengths based on the recorded focal lengths for smooth chronological variations of focal lengths; and
    generating smoothing images having a viewing angle corresponding to the smoothing focal lengths based on the smoothing focal lengths, the recorded focal lengths, and the recorded image data.

8. The method of claim 7, wherein the smoothing focal lengths are calculated such that the smoothing images are enlarged with respect to the recorded image data when the smoothing images are generated.

9. The method of claim 7, wherein the smoothing focal lengths are calculated for smooth chronological variations of the recorded focal lengths during one-way variation, either increasing or decreasing, of the recorded focal lengths.

10. The method of claim 7, wherein the smoothing focal lengths are calculated by performing a spline interpolation based on a point selected from the group consisting of a point at which the increasing chronological variations of the recorded focal lengths begin to decrease or the decreasing chronological variations of the recorded focal length begin to increase, a point at which a zooming operation begins, and a point at which the zooming operation ends.

11. The method of claim 7, wherein the recorded image data become the smoothing images in a case where the chronological variations of the recorded focal lengths are constant or have one-way variation, either increasing or decreasing.

12. The method of claim 7, further comprising synthesizing the smoothing images and images captured when a zooming operation has stopped.

13. An image capturing device comprising:
- a lens unit comprising a zoom lens that enlarges or reduces images of an object;
- an image capturing unit that captures a plurality of images of the object;
- a recording unit in which a plurality of images that are captured while a zoom lens, which enlarges or reduces images of an object, is manually operated by a user, and in which focal lengths corresponding to the plurality of images are recorded;
- a focal length calculating unit that calculates smoothing focal lengths based on the recorded focal lengths for smooth chronological variations of focal lengths; and
- an image generating unit that generates smoothing images having a viewing angle corresponding to the smoothing focal lengths based on the smoothing focal lengths, the recorded focal lengths, and the recorded image data.

14. The image capturing device of claim 13, wherein, after the image capturing operation is completed, the image generating unit synthesizes the smoothing images and images captured when a zooming operation has stopped.

15. The image capturing device of claim 13, wherein the image generating unit encodes the smoothing images and the images captured when a zooming operation has stopped in parallel.

16. The image capturing device of claim 13, wherein a flag indicating whether the zoom lens is being manually operated by a user or not is recorded to the recording unit.

17. The image capturing device of claim 13, wherein the image capturing unit comprises:
- an imaging device that photoelectrically converts images of the object into electric signals; and
- an image processing unit that converts the electric signals into displayable image signals.

18. The image capturing device of claim 13, wherein the lens unit is a replaceable lens.

* * * * *